United States Patent [19]

Kakogawa et al.

[11] 4,117,219

[45] Sep. 26, 1978

[54] PROCESS FOR PRODUCING STABILIZED POLYOLEFINS

[75] Inventors: Genjiro Kakogawa, Yokohama; Tetsumi Suzuki, Isehara; Nobuaki Goko, Fujisawa; Koji Mukuraguchi, Kawasaki, all of Japan

[73] Assignee: Mitsubishi Chemical Industries Limited, Tokyo, Japan

[21] Appl. No.: 820,912

[22] Filed: Aug. 1, 1977

[51] Int. Cl.$^2$ ............................................. C08F 6/10
[52] U.S. Cl. ............................... 528/494; 260/45.95 R
[58] Field of Search ............................................. 528/494

[56] References Cited

U.S. PATENT DOCUMENTS

| | | | |
|---|---|---|---|
| 2,974,132 | 3/1961 | Jacobi | 528/494 |
| 3,219,647 | 11/1965 | Dietz | 528/494 |
| 3,271,380 | 9/1966 | Dietz | 528/494 |
| 3,281,399 | 10/1966 | Dietz et al. | 260/88.2 |
| 3,287,343 | 11/1966 | Kutner | 260/93.7 |
| 3,338,878 | 8/1967 | Kutner | 260/94.9 |
| 3,415,800 | 12/1968 | Kutner | 528/494 |
| 3,436,386 | 4/1969 | Harris | 528/496 |

*Primary Examiner*—Stanford M. Levin
*Attorney, Agent, or Firm*—Oblon, Fisher, Spivak, McClelland & Maier

[57] ABSTRACT

A process for producing stabilized polyolefins comprising adding an epoxide to a polyolefin slurry obtained through polymerization of α-olefins in the presence of a catalyst containing a halide of a transition metal and an organoaluminum compound to render the catalyst remaining in the polymer inactive, and then subjecting the polyolefin slurry after the above inactivation treatment to an evaporation treatment. The process is extremely simple and results in polyolefins and molded products which are highly stable against discoloration and heat.

12 Claims, No Drawings

PROCESS FOR PRODUCING STABILIZED POLYOLEFINS

BACKGROUND OF THE INVENTION

This invention relates to a process for producing stabilized polyolefins by inactivating residual catalyst in the polymer.

Polyolefins are produced from olefins such as ethylene, propylene and the like by polymerizing the same usually in the presence of a catalyst prepared from a halide of a transition metal such as titanium, vanadium, zirconium and the like and an organometallic comound such as alkyl aluminum, alkyl aluminum halide and the like.

The polymerization catalyst of this type, in particular, the transition metal halide component contained therein is insoluble to an inert hydrocarbon used as a diluent for the polymerization reaction and liquefied monomer present in an excess amount and most portions thereof remain in the resulting polymer. Since the remaining catalyst results in undesirable discoloration upon heat plasticization of the polyolefins and reduces the heat stability of molded products, it should be removed from the polymer as much as possible.

Methods of removing a remaining catalyst from resulted polyolefins known so far include, for example, such a process as treating the resulted polymer with an alcohol to render the remaining catalyst water soluble and then extracting the same with water or washing out the catalyst with liquid hydrocarbon. Such an alcohol treatment, however, necessitates a costly corrosion resistant material for the apparatus since hydrogen halide produced through the reaction between the remaining catalyst and the alcohol attacks the apparatus, as well as requires complicated apparatus and processes for recovering and refining the alcohol and the hydrocarbon from the washing solution containing the decomposition products of the catalyst dissolved therein. Accordingly, it is of great importance from the industrial point of view to develop a method capable of removing or inactivating catalyst residues remaining in the product polyolefins with ease.

Various types of highly active catalysts have recently been proposed so that lesser amounts of catalyst need to be used to perform the polymerization reaction while simplifying the catalyst removal process. While the polyolefins polymerized in the presence of a highly active catalyst of this type contain only a comparatively small amount of residual catalyst, they still contain a small amount of catalyst having metal-to-halogen bonds, which releases active halogen upon heat plasticization of the polymer which attacks the apparatus. Moreover, the polyolefins containing small amounts of residual catalyst significantly lack thermal stability even with the addition of a conventional stabilizer and will undesirably discolor upon heat plasticization. It is known that such discoloration is attributable to the presence of a reaction product which is formed from a transition metal halide of a lower valency and a phenolic antioxidant. The discoloration can be prevented by treating the catalyst remaining in the polymer with a compound having a specific chelating action. In short, even the polyolefins polymerized in the presence of a highly active catalyst which is present in the polymerization system in only small residual amounts have only a poor commercial value unless subjected to an inactivation treatment. It is therefore a general requirement to remove the active halogen compound and to inactivate the residual transition metal compound to prevent discoloration of the polymer during heat plasticization and to improve the heat stability of the molded products.

DETAILED DESCRIPTION OF THE INVENTION

The inventors of the present application have conducted studies on the removal and the inactivation of residual catalyst in polyolefins and, as the result, have attained the present invention in which polyolefins of excellent stability can be produced with ease by the process which comprises inactivating the catalyst remaining in polyolefins, in particular, those produced in the presence of a highly active catalyst and then removing the halogen component in the catalyst through evaporation in an extremely simple treatment.

The process for producing stabilized polyolefins according to this invention is characterized by adding an epoxide to a polyolefin slurry resulted through the polymerization of α-olefins in the presence of a catalyst containing a transition metal halide and an organoaluminum compound to render the remaining catalyst inactive and then subjecting the polyolefin slurry after the above inactivation to an evaporation treatment.

The above epoxide treatment to the polyolefin slurry containing the remaining catalyst causes a reaction between the catalyst and the epoxide to produce a volatile halogen-containing compound (although the reaction mechanism and the chemical structure of the halogen-containing compound are not wholly analyzed at present), which is then removed through vaporization together with a monomer and a diluent upon evaporation treatment in the succeeding stage, whereby the remaining catalyst is inactivated and polyolefins of excellent stability can be obtained. It is disclosed here for the first time by the inventors of the present application that the halogen components in the remaining catalyst forms a volatile compound through the epoxide treatment and can then be removed easily through vaporization.

Polyolefins used in this invention include polymers or copolymers of α-olefins such as ethylene, propylene, butene-1, 4-methylpentene-1, 3-methylbutene and mixtures of such α-olefins.

The catalyst for use with the polymerization of the α-olefins essentially consists of transition metal halide and an organoaluminum compound. While various transition metal halides can be used as the first component of the catalyst as are well known and described above, particularly preferred are titanium trichloride or eutectic or mixed crytals of titanium trichloride and other metal halide. The halides may be a form of pulverizates, a mixture of two or more halides, a mixture with other organic compound or a complex compound. Further, they may be carried on a suitable support. Various organoaluminum compounds can be used as the second component in the catalyst, with alkylaluminum and alkylaluminum halide being particularly preferred. The catalyst may further be incorporated with a third component such as various compounds including N, O, P or Si unsaturated hydrocarbons, in addition to the above two components. The most preferred catalyst in this invention is a so-called highly active catalyst having a catalytic efficiency (number of grams resulting polymer per gram of catalyst) of more than 5,000, preferably, more than 8,000.

The polymerization reaction for the α-olefins in this invention may be effected in any desired process and usually conducted under the presence of a diluent. The diluent used herein includes hydrocarbons such as propane, butane, pentane, hexane and the like in a liquid state or an excess monomer kept in a liquid state under the polymerization pressure. Preferred diluents include relatively low boiling hydrocarbons, for example, those hydrocarbons having boiling point less than 40° C and, more preferably, those hydrocarbons having boiling point less than 10° C such as propane, butane, or monomer. It is most advantageous to simplify use the liquefied monomer as the diluent. A polymer slurry is formed upon dispersion of the polymer in the above diluent. The polyolefins obtained from gas phase polymerization, that is, polymerization of the gaseous monomer without using a diluent also falls within the scope of this invention.

The preferred epoxides used in this invention include those having 2-8 carbon atoms, for example, ethylene oxide, propylene oxide, 1,2-epoxybutane, 2,3-epoxybutane, 1,2-epoxypentane, 2,3-epoxypentane, 1,2-epoxypentene, 1,2-epoxyhexane, 1,2-epoxyhexene, cyclohexene oxide, styrene oxide and epichlorohydrin. Particularly preferred epoxides are those of low boiling points such as ethylene oxide and propylene oxide. The amount of the epoxide used relative to the catalyst component in the slurry (total amount of the transition metal compound and the organoaluminum compound) is usually sufficient in amounts less than 15 : 1 and, preferably, between 10 : 1 and 1 : 1 by molar ratio.

The inactivation treatment of the process of this invention may be practiced by adding an epoxide directly to the polyolefin slurry containing an unreacted monomer after the polymerization reaction, or by adding the epoxide to the polymer slurry after purging and flashing the unreacted monomer where a diluent of a comparatively high boiling point is used. A preferred embodiment of this invention comprises conducting the polymerization reaction in a diluent of, a liquid monomer in an excess amount of a low boiling hydrocarbon having a boiling point less than 10° C, adding an epoxide to the resulting polyolefin slurry before flashing to effect the inactivation treatment, and then subjecting the same to the flashing treatment while utilizing the flashing process per se to evaporate material from the reaction medium. Another preferred embodiment comprises cooling the gas which results from flashing to remove a fraction containing a halogen-containing compound as a basic component through condensation and recycling only the monomer to the reaction system for reuse. In a further embodiment, where a hydrocarbon of a relatively high boiling point is used as the diluent, an epoxide may be added to inactivate the polymer slurry obtained by moderately flashing or purging the slurry after the polymerization to remove unreacted monomer and, if required, a portion of the diluent, followed by the evaporation treatment such as heat evaporation under an atmospheric or properly reduced pressure. In this case, most portions of the evaporated products are halogen-containing compounds and can be wholly condensed and removed.

Temperature for the above inactivation treatment by epoxide addition lies above ambient temperature, preferably, in a range more than 70° C and below the melting point of the polymer and, most preferably, between 80° and 100° C. Below the ambient temperature, the reaction between the catalyst remaining in the polymer and the epoxide does not proceed well with the result that halogen removal and catalyst inactivation are difficult. At temperatures above the melting point of the polymer, the removal of halogen and the inactivation of the catalyst are also difficult since the polymer is in a molten state, where insufficient contact with the epoxide is achieved. The time for inactivation generally ranges between several minutes to 180 minutes and, preferably, between 10-60 minutes.

The polymer slurry after inactivation is then directly subjected to the evaporation treatment with no further treatment by any other catalyst decomposing agent nor any washing treatment with a liquid hydrocarbon. The evaporation treatment in this invention may be conducted, as described previously, by a conventional flashing or purging process, or an additional heat evaporation process under atmospheric or properly reduced pressure. Through the above evaporation treatment, the volatile halogen-containing compound formed in the reaction between the catalyst and the epoxide in the above inactivation treatment stage is vaporized and removed together with the monomer and the diluent.

While the vaporized products in the evaporization stage are a mixture composed of monomer, diluent, unreacted epoxide and volatile halogen-containing compound, the volatile halogen-containing compound has a higher boiling point and can easily be separated from the mixture, for instance, by condensation with cooling. Accordingly, the monomer or the diluent are less likely to be contaminated by the decomposition products of the present catalyst.

The technical advantages and the like of the present invention will now be described.

The first advantage of the present invention is that the halogen component of the catalyst remaining in the polymer slurry obtained by the polymerization of an α-olefin is converted into a volatile compound and removed through vaporization to stabilize the remaining catalyst in an extremely easy process of adding an epoxide to the polyolefin slurry and then merely evaporating the polyolefin slurry thus treated. Although epoxides such as alkaline oxides have been used so far for refining polyolefins or inactivating the catalyst therefor, most of them have been used only for auxiliary purposes.

Prior literature references, for example, Japanese patent publication No. 26785/1963 describe that alkylene oxides can be used for such auxiliary purposes as binding hydrogen halide (HX) inactivate the same which is formed by the reaction between a metal halide ($MX_n$) of the catalyst and an alcohol (ROH) as the second treating agent or water as shown in the following equations:

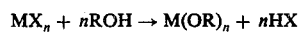

$MX_n + nROH \rightarrow M(OR)_n + nHX$

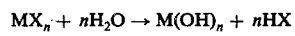

$MX_n + nH_2O \rightarrow M(OH)_n + nHX$

British patent specification No. 799207 discloses the treatment of a polyolefin slurry with an alkylene oxide, but the process is combined with the known catalyst inactivation treatment consisting of an acetone or alcohol treatment followed by water washing. In Japanese patent publication No. 26785/1963, a polyolefin is treated with an alcohol, washed with water, then treated with an alkylene oxide and further subjected to water washing and filtration. Further, in Japanese Patent Laid Open Publication No. 55784/1974, a polyolefin slurry is treated with epoxides and, thereafter, washed with a lower hydrocarbon (for example, liquid propylene).

In the present invention on the other hand, the polyolefin slurry after being subjected to the epoxide treatment is merely evaporated, wherein the process per se is extremely simplified and no other decomposing agent, washing hydrocarbon and water are necessary at all. Consequently, apparatus and processes for recovering and refining the hydrocarbons and the like can be eliminated and the waste water treatment is simplified.

While U.S. Pat. No. 2,709,174 discloses that $TiCl_4$ reacts with an alkylene oxide to produce $Ti(OCH_2CH_2Cl)_4$, no description can be found at all which describes the behavior of the resulting compound. Although the halogen component in the polyolefin is significantly reduced by the epoxide treatment of the process of the present invention, it is apparent that the halogen component does not vaporize in the form of a compound such as $Ti(OCH_2CH_2Cl)_4$ because the transition metal component such as the Ti content shows no substantial reduction.

The second advantage of the present invention is that it produces highly stabilized polyolefins and provides polyolefin products of excellent color and heat resistance. The polyolefin products have the additional advantage that costly corrosion resistant materials are not required for the molding and fabrication apparatus since they contain no corrosive active halogen containing moiety such as hydrogen halide. More specifically, the polyolefins obtained according to this invention exhibit a more desirable color when they are molded into pellets or are molded therefrom by heat plasticization with the addition of a phenolic antioxidant in comparison with polyolefins obtained by conventional alcohol treatments. In addition, when the present polyolefin product is subjected to a long time heat stability test conducted on pressed pieces in an open test at 150° C, the products of the present invention showed better heat resistance on a daily basis of several tens of percent. It is, therefore, a surprising effect which is quite unexpected from the knowledge of the prior art that highly stabilized polyolefins of much improved color and heat resistance can be obtained by such a simple treatment as the present process is.

Although the details of the reaction mechanism and the like which yield polyolefins of excellent color and heat resistance in the epoxide treatment and the evaporation treatment according to this invention are not completely understood, the inventors have confirmed the following facts based upon experiments.

When two model reactions were conducted in which titanium trichloride was treated with propylene oxide or with isopropyl alcohol and then the resulting material was contacted with 2,6-di-t-butyl-4-methylphenol at high temperature, the titanium trichloride treated with the alcohol developed a distinct red brown color at 150°–200° C, while the titanium trichloride treated with the propylene oxide developed no color at all. Furthermore, the formation of a tetra-valent compound from titanium trichloride by the propylene oxide treatment was confirmed by observation of the absorption signal in an electron spin resonance spectrum. In other words, the absorption signal in the vicinity of a g value at 2.0 which is characteristic of trivalent titanium and is usually observed after the alcohol treatment was not observed at all in the case of the propylene oxide treatment of the present invention. The absence of $Ti^{+3}$ in the titanium trichloride after the propylene oxide treatment was also confirmed by chemical analysis.

It can be supposed from the above model reactions that Ti component of the catalyst remaining in the polyolefin products obtained by the process of this invention is in a higher valent state and hence stable against a phenolic antioxidant and the like. Such a stabilized Ti component is not required to remove from the polyolefins in view of the discoloration and the heat resistance of the polymer.

The advantageous features of this invention over various prior arts are summarized as follows:

(1) The process and the apparatus per se for the treatment are extremely simplified, since the present process only comprises treating the polyolefin slurry by the addition of an epoxide and then vaporizing the slurry.

(2) The process requires no other chemicals such as alcohols, acetones, or hydrocarbons for washing use and, consequently, no apparatus and process for recovering and refining such chemicals.

(3) Easy recovery and refining of the monomer and the epoxide are possible since the volatile halogen-containing compound as the decomposition products of the catalyst has a relatively higher boiling point and can easily be separated from the monomer, epoxide and the like, for example, through condensation under cooling.

(4) Polyolefin products result no discoloration when plasticized by adding a phenolic anti-oxidant.

(5) Polyolefin products have a satisfactory heat stability.

(6) Polyolefin products contain no liberated hydrogen halides, which may chemically attack the apparatus, and there are no needs for expensive corrosion resistant material, for example, for the fabrication apparatus.

This invention is to be described referring to working examples and comparison examples.

EXAMPLE 1

(a) Preparation of highly active purple titanium trichloride catalyst

To a 500 ml four-necked flask substituted with well-dried argon, were charged 125 ml n-heptane and 100 mmol titanium tetrachloride, and 150 mmol di-n-dodecylether was further added. On gradually adding dropwise 50 mmol triethylaluminum dissolved in 50 mmol n-heptane to the content of the flask maintained at 25° C under stirring, a green tinted brown black titanium trichloride was obtained as a uniform solution in n-heptane. On adding 100 mmol titanium tetrachloride gradually to the above solution kept at 60° C, precipitation of purple titanium trichloride was soon observed. The solution temperature was kept at 60° C for 20 minutes in order to complete the precipitation reaction. Then, the precipitated titanium trichloride was separated by filtration and washed with 100 ml n-hexane for five times to obtain a solid purple catalyst of titanium trichloride.

(b) Propylene polymerization

To a two liter induction stirring type autoclave replaced with well dried argon gas, were charged 32 mg of the highly active purple catalyst of titanium trichloride as prepared in (a) above and then 1.1 mmol diethylaluminum monochloride. Then, after sealing hydrogen gas at 0.85 kg/cm$^2$.G, 700 g liquid propylene was charged and polymerization was effected at 60° C for 3 hours.

(c) Treatment for polypropylene slurry

After the completion of the polymerization in (b) above, 15 mmol propylene oxide was charged under pressure using argon gas before purging of the excess propylene. Temperature was raised up to 70° C and kept there for 30 minutes. Then, propylene was purged and replaced with dried argon.

(d) Physical properties and the like of the polypropylene products

Polypropylene obtained in (c) above was white crystalline powder having a Ti content of 27 ppm and a Cl content of 37 ppm.

A mixture of 2,6-di-t-butyl-p-cresol and dilaurylthiopropionate in 1 : 2 weight ratio was added to the polypropylene in an amount of 0.3% by weight based on the weight of the polymer and pelletized in a 30 mm $\phi$ extruder, to obtain colorless semiopaque pellets.

COMPARISON EXAMPLE 1

Polypropylene powder was produced as in Example 1 but with no application of the propylene oxide treatment at all.

The Ti content and the Cl content in the polypropylene were measured and determined as 27 ppm and 111 ppm respectively.

The polypropylene powder showed a pale purple color in an argon atmosphere and resulted pellets slightly colored in brown black through the same pelletization as in (d) in Example 1.

REFERENCE EXAMPLE 1

Polypropylene prepared from (d) in Example 1 and from Comparison Example 1 was formed into press sheets of 1 mm thick and kept in an electric furnace at 150° C to determine the days required for the heat degradation (referred to as LTHS) and the result are shown in Table 1.

Table 1

|  |  | LTHS |
|---|---|---|
| Example 1 = (d) | Propylene oxide treated | 23 days |
| Comparison Example 1 | Not treated | 4 days |

EXAMPLE 2

The same procedures as in (a), (b) and (c) in Example 1 were repeated excepting the use of 1-butene instead of propylene in (b) and ethylene oxide instead of propylene oxide in (c) in Example 1. As the polybutene produced dissolves in 1-butene, the reaction mixture is more viscous compared with polymerization of propylene, which results in difficulty of stirring the reaction mixture.

Therefore, in the present example, in order to ease the stirring, the one-fifth amount of catalyst of Example 1 (b) was used.

The polybutene produced was white powder having a 39 ppm of Ti content and a 46 ppm of Cl content. When the polybutene was pelletized in the same manner as in (d) in Example, colorless semiopaque pellets were obtained.

COMPARISON EXAMPLE 2

Polybutene powder was produced as in Example 2 but with no ethylene oxide treatment. The polybutene had a 39 ppm of Ti content and a 172 ppm of Cl content. The polybutene powder showed a pale purple color in an argon atmosphere and slightly discolored in brown black through pelletization.

EXAMPLES 3 AND 4

Polypropylene slurry after the polymerization was treated just in the same way as in Example 1 excepting the use of 1,2-epoxybutane or 1,2-epoxypentane instead of propylene oxide in Example 1. The Ti and Cl content and the color of the polymer resulted from the treatment were as shown in Table 2.

Table 2

| Example | Epoxide | Ti/polypropylene:ppm | Cl/polypropylene:ppm | Color |
|---|---|---|---|---|
| 3 | 1,2-epoxybutane | 26 | 40 | colorless semiopaque |
| 4 | 1,2-epoxypentane | 27 | 41 | colorless semiopauqe |

EXAMPLE 5

To a two liter-induction stirring type autoclave substituted with well dried argon, were charged 750 ml n-pentane. Then 39 mg of the highly active purple titanium trichloride catalyst prepared in (a) in Example 1 and 1.3 mmol diethylaluminum monochloride were added. Thereafter, hydrogen was sealed under a pressure of 0.7 kg/cm$^2$.G and then propylene was charged to 12 kg/cm$^2$.G. The polymerization was conducted under constant pressure for 4 hours at 60° C.

After the completion of the polymerization, excess propylene was purged and 15 mmol propylene oxide was then charged under pressure using argon gas. The temperature was raised up to 70° C and kept there for 30 minutes. Then, n-pentane was purged and substituted with dried argon. The polypropylene produced was white crystalline powder having a 40 ppm of Ti content and a 41 ppm of Cl content.

A mixture of 2,6-di-t-butyl-p-cresol and dilaurylthiopropionate in 1 : 2 weight ratio was added to the polypropylene in an amount of 0.3% by weight based on the weight of the polymer and then pelletized in a 30 mm $\phi$ extruder to produce colorless semiopaque pellets.

COMPARISON EXAMPLE 3

Polypropylene powder was obtained just in the same manner as in Example 5 but with no propylene oxide treatment.

The Ti content and the Cl content of the polypropylene were measured and determined as 40 ppm and 163 ppm respectively. After the pelletization, the products slightly showed a brown black color.

What is claimed is:

1. A process for producing a stabilized polyolefin, consisting essentially of the steps of: adding an epoxide of 2 to 8 carbon atoms to a polyolefin slurry obtained through polymerization of an α-olefin in the presence of a catalyst containing a halide of a transition metal and an organoaluminum compound and having a catalytic efficiency of more than 5,000 to render the catalyst remaining in the polymer inactive; and then evaporating volatile materials from the polyolefin slurry after the inactivation treatment.

2. The process as defined in claim 1, wherein the epoxide is propylene oxide.

3. The process as defined in claim 1, wherein the amount of the epoxide to that of the catalyst component in the polyolefin slurry is less than about 15 : 1 by molar ratio.

4. The process as defined in claim 1, wherein the epoxide is added to the polyolefin slurry prior to the removal of the unreacted monomer therefrom.

5. The process as defined in claim 1, wherein the epoxide is added to the polyolefin slurry after the removal of the unreacted monomer therefrom.

6. The process as defined in claim 1, wherein the inactivation treatment is carried out at a temperature of between about 70° C and the melting point of the polymer.

7. The process as defined in claim 6, wherein the temperature is between about 80° C and 100° C.

8. The process as defined in claim 1, wherein the inactivation treatment is effected for a time between about 10 and 60 minutes.

9. The process as defined in claim 1, wherein the evaporation treatment is effected by a flashing or purging treatment.

10. The process as defined in claim 1, wherein the polymerization of the α-olefins is effected in the presence of a diluent.

11. The process as defined in claim 10, wherein the diluent is a liquid monomer used for the polymerizaton.

12. The process as defined in claim 1, wherein the α-olefin is propylene.

* * * * *

UNITED STATES PATENT AND TRADEMARK OFFICE
CERTIFICATE OF CORRECTION

PATENT NO. : 4,117,219
DATED : September 26, 1978
INVENTOR(S) : Genjiro Kakogawa et al It is certified that error appears in the above—identified patent and that said Letters Patent are hereby corrected as shown below:

Column 4, line 42, delete "alkaline" and insert --alkylene--.

Column 5, line 38, delete "open" and insert --oven--.

Column 5, line 58, delete "150°" and insert --150°C--.

Column 6, line 18, delete "acetones" and insert --acetone--.

Column 7, line 3, delete "for" and insert --of--.

Column 7, line 22, delete "comparison" and insert --comparative--.

Column 7, line 36, delete "comparison" and insert --comparative--.

Column 7, line 63, delete "Example," and insert --Example 1--.

Column 7, line 65, delete "comparison" and insert --comparative--.

Column 8, line 46, delete "comparison" and insert --comparative--.

Column 8, line 62, delete "ahd" and insert --and--.

Signed and Sealed this

Twenty-second Day of May 1979

[SEAL]

Attest:

RUTH C. MASON
Attesting Officer

DONALD W. BANNER
Commissioner of Patents and Trademark